US010437985B2

(12) United States Patent
Trostle et al.

(10) Patent No.: US 10,437,985 B2
(45) Date of Patent: Oct. 8, 2019

(54) USING A SECOND DEVICE TO ENROLL A SECURE APPLICATION ENCLAVE

(71) Applicant: Intel Corporation, Santa Clara, CA (US)

(72) Inventors: Jonathan Trostle, Vancouver, WA (US); Paritosh Saxena, Portland, OR (US); Ernie Brickell, Hillsboro, OR (US); Thomas J. Barnes, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 15/283,357

(22) Filed: Oct. 1, 2016

(65) Prior Publication Data

US 2018/0096137 A1 Apr. 5, 2018

(51) Int. Cl.
*G06F 21/53* (2013.01)
*G06F 21/34* (2013.01)
*G06F 21/44* (2013.01)
*G06F 21/33* (2013.01)

(52) U.S. Cl.
CPC .............. *G06F 21/53* (2013.01); *G06F 21/33* (2013.01); *G06F 21/34* (2013.01); *G06F 21/44* (2013.01); *G06F 2221/2103* (2013.01)

(58) Field of Classification Search
CPC ........... G06F 21/53; G06F 21/33; G06F 21/34
USPC ......................................................... 726/19
See application file for complete search history.

(56) References Cited

U.S. PATENT DOCUMENTS

| 9,087,200 | B2 | 7/2015 | McKeen et al. |
| 9,276,750 | B2 | 3/2016 | Scarlata et al. |
| 9,667,628 | B2* | 5/2017 | Johnson .............. H04L 63/0876 |
| 2015/0347768 | A1* | 12/2015 | Martin .................... G06F 21/62 726/1 |
| 2017/0118215 | A1* | 4/2017 | Varadarajan ........ H04L 63/0236 |
| 2017/0373844 | A1* | 12/2017 | Sykora .................. H04L 9/0861 |

* cited by examiner

*Primary Examiner* — Jason K Gee
*Assistant Examiner* — Dereena T Cattungal
(74) *Attorney, Agent, or Firm* — Trop, Pruner & Hu, P.C.

(57) ABSTRACT

A method, apparatus, and computer-readable medium are provided to determine whether to enroll a computing device as a provider of a secure application enclave for an application. The following information is obtained from a second computing device: a device identifier for a first computing device, application information, and data for a shared secret. The first computing device is configured to provide a secure application enclave to support execution of the application associated with the application information, and the shared secret is shared between the secure application enclave and a user of the first computing device. A determination is made whether to enroll the first computing device as a provider of the secure application enclave for the application using the device identifier, the application information, and the data for the shared secret. The secure application enclave may be notified whether the enrollment of the first computing device is successful.

20 Claims, 8 Drawing Sheets

400

USING A SECOND DEVICE TO ENROLL A SECURE APPLICATION ENCLAVE

TECHNICAL FIELD

The present invention relates to security of computing devices, and in particular, to enabling a user to recognize when a computing device processing the user's secrets has been compromised.

BACKGROUND

Given the prevalence of malware in today's Internet environment, many users are hesitant to perform transactions involving private information, such as financial transactions, online. It is difficult for a user to assess whether a particular computing environment provides adequate protection of the user's secrets. Establishing the user's initial local trust in an execution environment is a long-standing challenge in trusted computing.

Two approaches for ensuring users that a computing environment will protect user secrets have been used. Both approaches involve creation of a trusted execution environment (TEE), which establishes a software execution environment in which executing code may be measured, verified, or otherwise determined to be authentic. In one solution, an assumption is made that a computing platform is initially free of malware. A trusted execution environment (TEE) is established on the initial computing platform, a trusted image is created and sealed to the TEE, and the trusted image can be deleted from software outside the TEE. The trusted image is used in the future by the TEE to assure the user that the TEE is being used. However, malware could discover and display the trusted image while executing, thereby undermining the trust placed in the TEE by users.

In another approach, a TEE performs a remote attestation with a remote service. The user contacts the remote service through out-of-band communication to obtain assurance that a TEE is being used. However, malware could insert itself onto the user's platform and communicate with the service provider in place of the user. It is difficult for the user to ascertain whether the service provider is communicating directly with the platform of the user. Instead, it is possible that malware has inserted itself into the communication such that the service provider is communicating with a TEE on another platform, and malware on the user's platform is communicating with the TEE on the other platform.

DETAILED DESCRIPTION

Techniques are disclosed for establishing a secure environment that enables a user to recognize that a computing device that is processing sensitive data of the user has been compromised by malware. This secure environment can be established even on a computing device where malware has placed the computing device under the control of an adversary. With the help of a second device (e.g., a smartphone), the user of the computing device can establish a secure application enclave and a shared secret known only to the secure application enclave and the user, such as a window pattern, display indicator, or cryptographic key. This shared secret can be used to indicate to the user that the secure application enclave is processing the user's secrets. For example, the shared secret may be a secret display indicator (window pattern) that can be displayed to the user, using secure display technologies such as Protected Audio/Video Path (PAVP) or sprite windows, whenever the secure application enclave is requesting input from the user. If the shared secret is not displayed when input is being requested, the user can recognize that the secure application enclave is not requesting the input and therefore that the computing device has been compromised. By enabling the user to recognize when communications between the computing device and the user are known to be secure and under the control of the secure application enclave, the user can trust that additional secrets established between the secure application enclave and the user will be secure. The techniques disclosed herein may be used to enable a user to trust that the user's secrets are protected by a secure application enclave even though the device may have otherwise been compromised.

Figure 1:
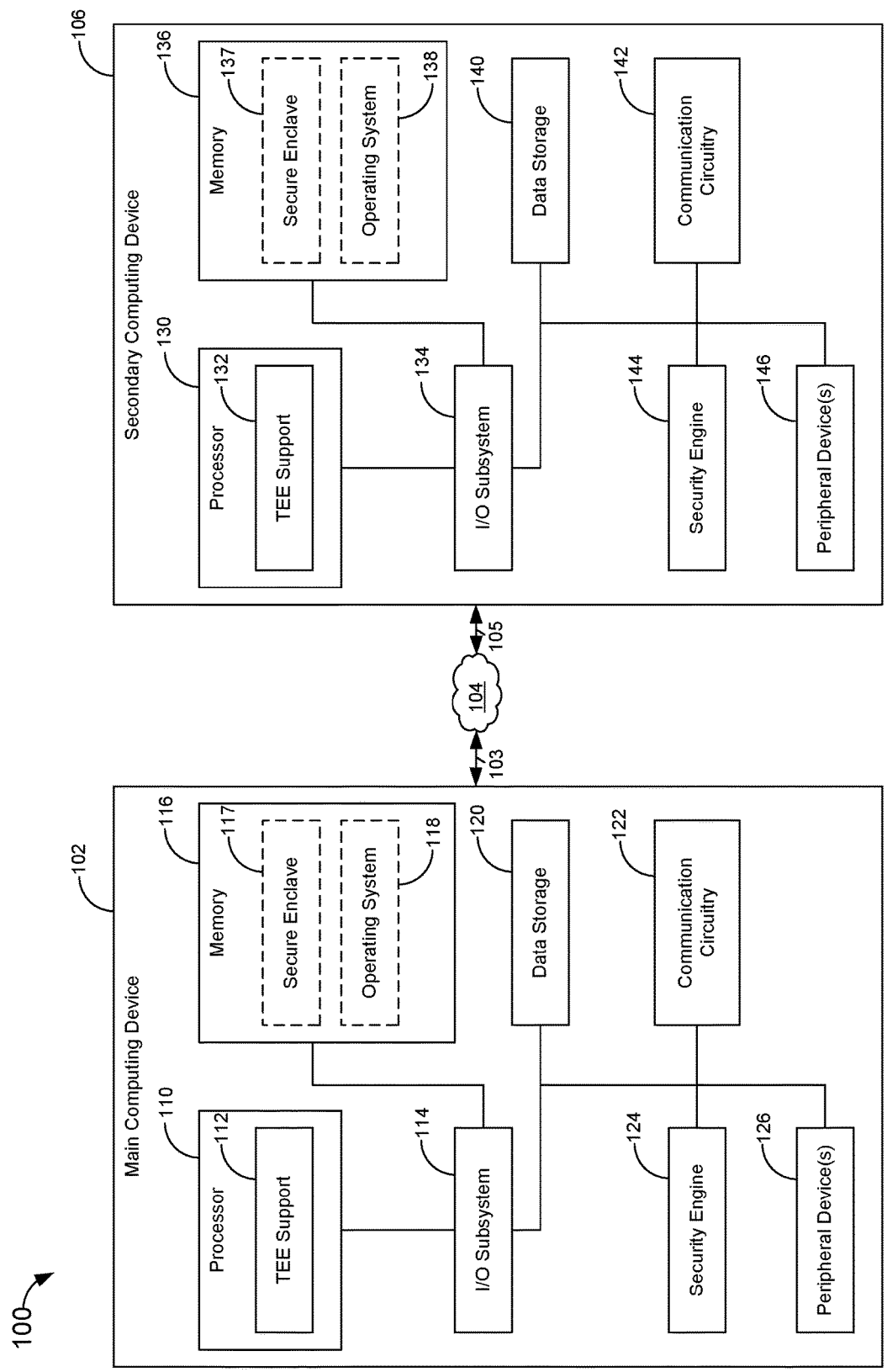
FIG. 1 is a block diagram of a computing environment in which embodiments of the invention may be used.

Referring now to FIG. 1, in an illustrative embodiment, an environment 100 for secure processing of a user's secrets includes a main computing device 102 and a secondary computing device 106. Main computing device 102 is connected to a network 104 (e.g., the Internet), via connection 103, and secondary computing device 106 is connected to the network 104 via connection 105. Notably, it is not necessary that main computing device 102 and secondary computing device 106 are connected to each other. The techniques described herein can be used when main computing device 102 and secondary computing device 106 are not connected.

With regard to network 104, the term "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Each of computing devices 102 and 106 may be embodied as any type of computation or computing device capable of performing the functions described herein, including, without limitation, a computer, a mobile computing device (e.g., smartphone, tablet, laptop, notebook, wearable, etc.), a server (e.g., stand-alone, rack-mounted, blade, etc.), a network appliance (e.g., physical or virtual), a web appliance, a distributed computing system, a processor-based system, and/or a multiprocessor system. In one embodiment, at least one of the computing devices 102 and 106 is a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability. The illustrative main computing device 102 includes a processor 110, an input/output (I/O) subsystem 114, a memory 116, a data storage device 120, communication circuitry 122, a security engine 124, and one or more peripheral devices 126.

Of course, the main computing device 102 may include other or additional components, such as those commonly found in a computing device, in other embodiments. Additionally, in some embodiments, one or more of the illustrative components may be incorporated in, or otherwise form a portion of, another component. For example, the memory 116, or portions thereof, may be incorporated in the processor 110 in some embodiments. Further, in some embodiments, one or more of the illustrative components may be omitted from the main computing device 102.

The processor 110 may be embodied as any type of processor capable of performing the functions described herein. The processor 110 may be embodied as a single or multi-core processor(s), digital signal processor, microcontroller, or other processor or processing/controlling circuit. The illustrative processor 110 includes trusted execution environment (TEE) support 112. The TEE support 112 allows the processor 110 to establish a software execution environment in which executing code may be measured, verified, or otherwise determined to be authentic.

Additionally, code and data included in the software TEE may be encrypted or otherwise protected from being accessed by code executing outside of the software TEE. In some embodiments, the TEE support 112 may be embodied as Intel® Software Guard Extensions (SGX) technology. Intel® SGX technology may be embodied as a set of processor instruction extensions that allow the processor 110 to establish one or more secure enclaves 118 in the memory 116, which may be embodied as regions of memory including software that are isolated from other software executed by the processor 110.

The memory 116 may be embodied as any type of volatile or non-volatile memory or data storage capable of performing the functions described herein. In operation, the memory 116 may store various data and software used during operation of the main computing device 102, such as operating systems (e.g., operating system 117), applications, programs, libraries, and drivers. In some embodiments, the memory 116 may include one or more secure enclaves 118 (i.e., software isolation trusted execution environments (TEEs)). Each secure enclave 118 may be embodied as a protected region of the memory 116. Each secure enclave 118 may include code and data that is measured, validated, or otherwise authenticated.

Similar to the TEE, the contents of the secure enclave 118 may be protected from access by software executing outside of the same secure enclave 118 (even from other secure enclaves executing on the same device 102). The contents of each secure enclave 118 may be protected from access and/or tampering using any combination of hardware protection and/or cryptographic protection. For example, each secure enclave 118 may be embodied as a secure enclave created and otherwise managed using Intel® SGX technology. In some embodiments, a part of or the entirety of the secure enclave 118 may be stored in a specialized memory structure such as an enclave page cache (EPC).

The memory 116 is communicatively coupled to the processor 110 via the I/O subsystem 114, which may be embodied as circuitry and/or components to facilitate input/output operations with the processor 110, the memory 116, and other components of the main computing device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 116, and other components of the main computing device 102, on a single integrated circuit chip.

The data storage device 120 may be embodied as any type of device or devices configured for short-term or long-term storage of data such as, for example, memory devices and circuits, memory cards, hard disk drives, solid-state drives, or other data storage devices. The data storage device 120 and/or the memory 116 (e.g., the computer-readable storage media) may store various data as described herein, including operating systems such as operating system 117, applications, programs, libraries, drivers, instructions, etc., capable of being executed by a processor (e.g., the processor 110) of the main computing device 102.

The communication circuitry 122 may be embodied as any communication circuit, device, or collection thereof, capable of enabling communications between the main computing device 102 and other computing devices (e.g., the secondary computing device 106) over network connection 104 (e.g., over the Internet). The communication circuitry 122 may be configured to use any one or more short-range wireless communication technologies and associated protocols (e.g., Bluetooth®, Bluetooth® Low Energy (BLE), near-field communication (NFC), and/or any other short-ranged wireless communication protocol) to effect such communication. The communication circuitry 122 may be additionally configured to use any one or more other communication technologies (e.g., wireless or wired communication technologies) and associated protocols (e.g., Ethernet, Wi-Fi®, WiMAX, LTE, 5G, etc.) to effect communication with other computing devices, such as over network 104, for example.

The security engine 124 may be embodied as any hardware component(s) or circuitry capable of establishing a trusted execution environment (TEE) on the main computing device 102. In particular, the security engine 124 may support executing code and/or accessing data that is independent and secure from other code executed by the main computing device 102. The security engine 124 may be embodied as a Trusted Platform Module (TPM), a manageability engine (ME), an out-of-band processor, or other security engine device or collection of devices. In some embodiments the security engine 124 may be embodied as a converged security and manageability engine (CSME) incorporated in a system-on-a-chip (SoC) of the main computing device 102. Further, in some embodiments, the security engine 124 may also be capable of communicating using the communication circuitry 122 and/or a dedicated communication circuit independently of the state of the main computing device 102 (e.g., independently of the state of the processor 110), also known as "out-of-band" communication.

The peripheral devices 126 may include any number of input/output devices, interface devices, and/or other peripheral devices. For example, in some embodiments, the peripheral devices 126 may include a display, a touch screen, biometric sensors, graphics circuitry, a keyboard, a mouse, a microphone, a speaker, and/or other input/output devices, interface devices, and/or peripheral devices. The particular devices included in the peripheral devices 126 may depend on, for example, the type and/or intended use of the main computing device 102. The peripheral devices 126 may additionally or alternatively include one or more ports, such as a USB port, for example, for connecting external peripheral devices to the main computing device 102.

Similar to the illustrative main computing device 102, the secondary computing device 106 includes a processor 130 having TEE support 132, an I/O subsystem 134, a memory 136 including secure enclave 138, a data storage device 140, communication circuitry 142, a security engine 144, and one or more peripheral devices 146. For purposes of the techniques disclosed herein, TEE support 132 and secure enclave 138 support are optional; TEE support 132 and secure enclave 138 may be present but are not required for functionality of secondary computing device 106 as described herein. Further descriptions of the like components are not repeated herein with the understanding that the description of the corresponding components provided above in regard to the main computing device 102 applies equally to the corresponding components of the secondary computing device 106. The secondary computing device 106 may include other components, sub-components, modules, sub-modules, and/or devices commonly found in a computing node, which are not illustrated in FIG. 1 for clarity of the description.

Figure 2:
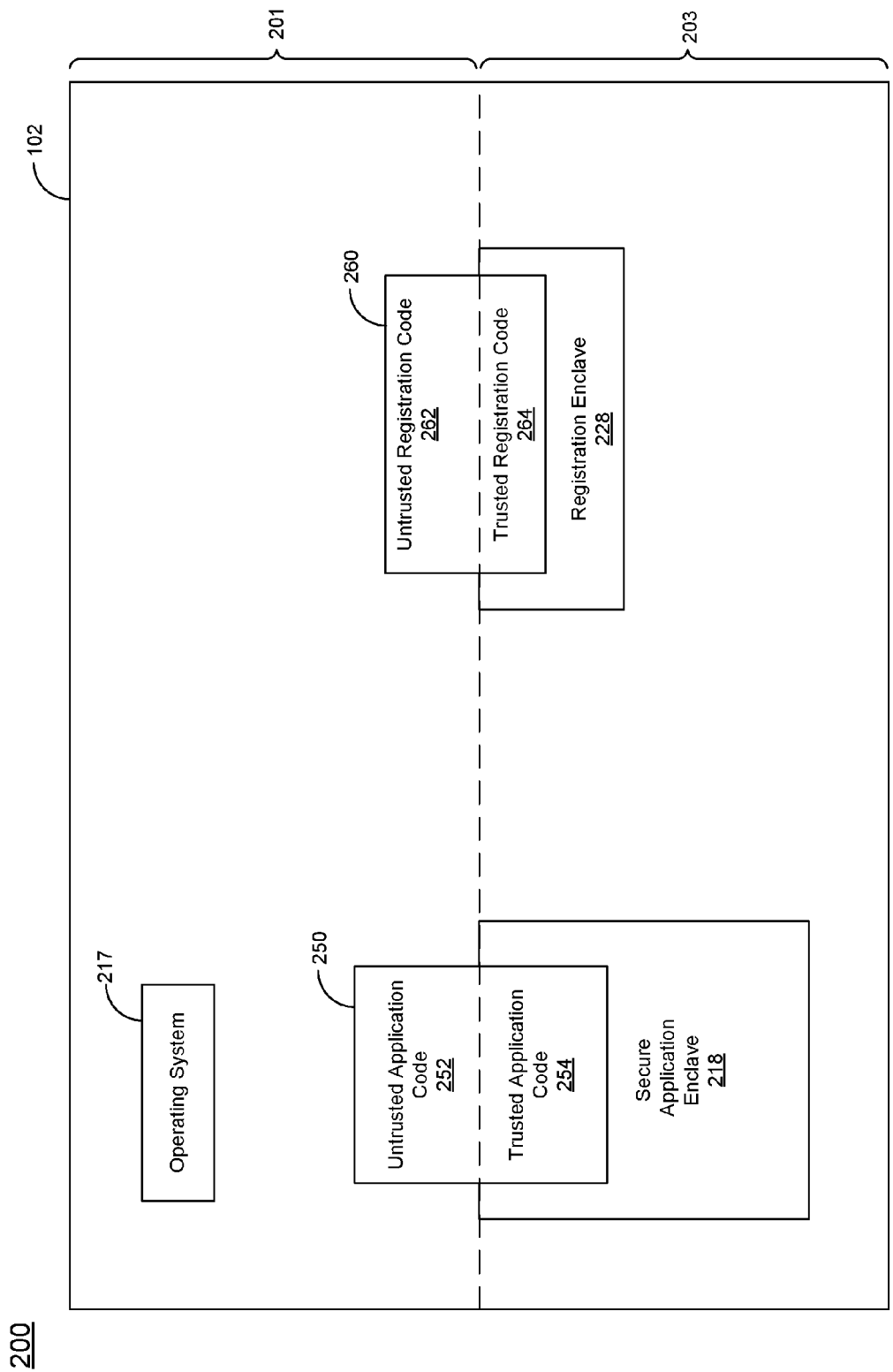
FIG. 2 is a block diagram of an operating environment of the main computing device of FIG. 1.

Referring now to FIG. 2, in an illustrative embodiment, the main computing device 102 establishes an environment 200 during operation. The illustrative environment 200 includes an untrusted environment 201, in which operating system 217 executes, and trusted execution environment 203, which includes a registration enclave 228 and a secure application enclave 218. An application 250 is shown with two portions, untrusted application code 252, which executes in untrusted environment 201, and trusted application code 254, which executes within secure application enclave 218 in trusted environment 203. The term "secure application" is used herein to refer to an application that is configured to operate within a protected environment provided by a secure application enclave. A registration application 260 is also shown with two portions, untrusted registration code 262, which executes in untrusted environment 201, and trusted registration code 264, which executes within registration enclave 228 in trusted environment 203.

In one embodiment, each secure application enclave has a self-signed certificate referred to as a SIGSTRUCT. The self-signed certificate contains an identifier for the secure application enclave (SAE), which is a tuple ID=(MRSIGNER, ISVPRODID, ISVSVN). The identifier for the secure application enclave includes a hash of the signer authority public key (MRSIGNER), the secure application product ID (ISVPRODID), and the secure application security version number (ISVSVN). An identifier for an application matches the secure application enclave (SAE) identifier if the first two values equal the values from the enclave's valid SIGSTRUCT, and the ISVSVN is less than or equal to the ISVSVN from the SIGSTRUCT. The SIGSTRUCT values may be presented in a secure application enclave report (for local attestation, for example, with a local registration enclave) or a quote (for remote attestation with a server, for example).

Figure 3:
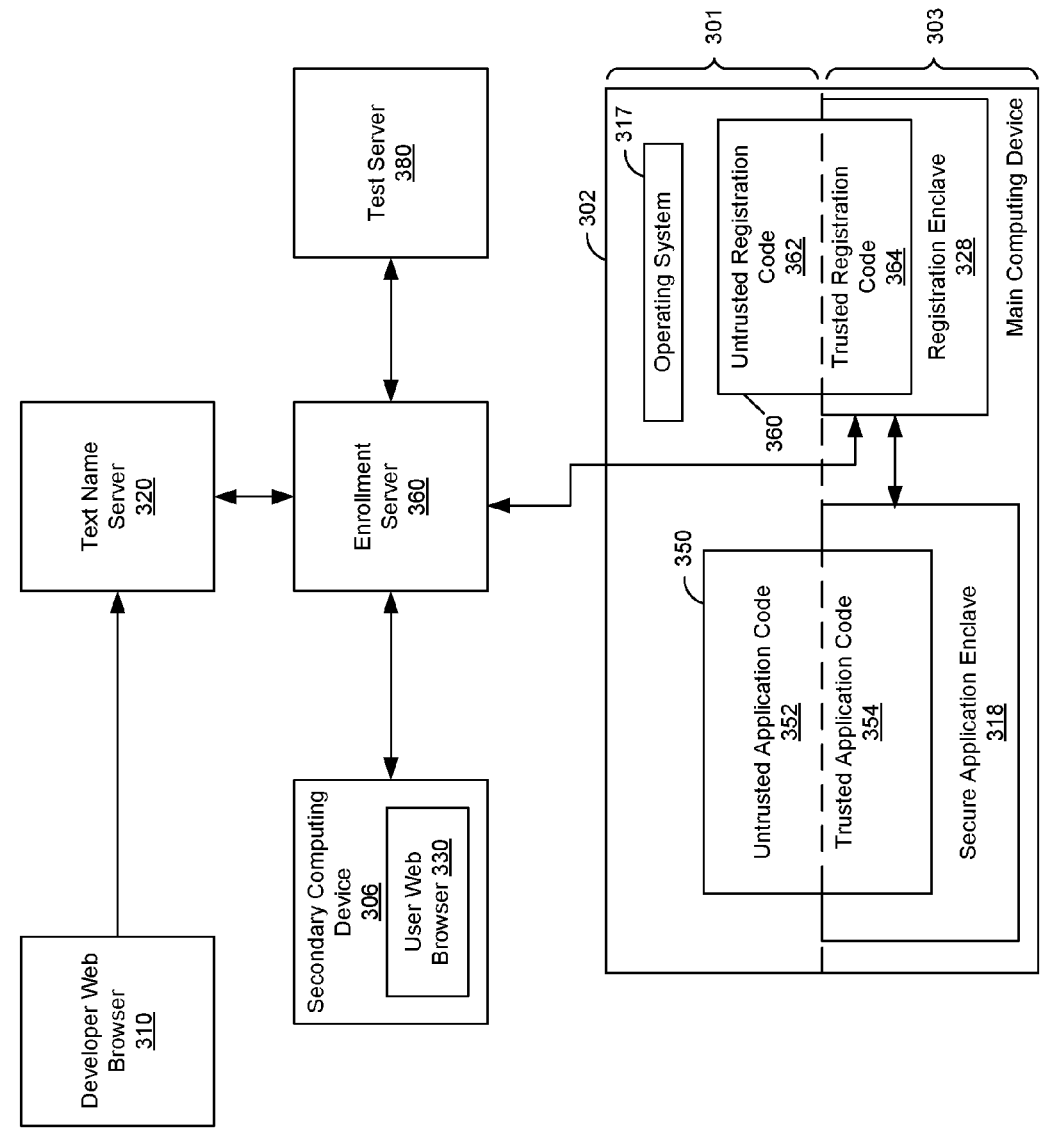
FIG. 3 is a block diagram of another computing environment in which embodiments of the invention may be used.

Referring to FIG. 3, an environment 300 is shown in which the present invention can be used. As an initial step prior to deployment of secure application 350, a developer of a secure application 350 uses a developer web browser 310 to interact with a text name server 320 to register the secure application 350 with the text name server 320. A user of user web browser 330 of secondary computing device 306 interacts with an enrollment server 360 to initiate enrollment of a secure application enclave 318 for secure application 350 on main computing device 302. Enrollment server 360 interacts with registration enclave 328 of main computing device 302 to enroll secure application enclave 318 as associated with main computing device 302. Enrollment server 360 also interacts with text name server 320 to obtain identification information and confirm a registered text name for a secure application, such as secure application 350. Enrollment server 360 also interacts with test server 380 to validate enrollment of the secure application enclave 318 on main device 302. Each of these interactions between components of environment 300 is described in further detail in the Figures below.

Figure 4:
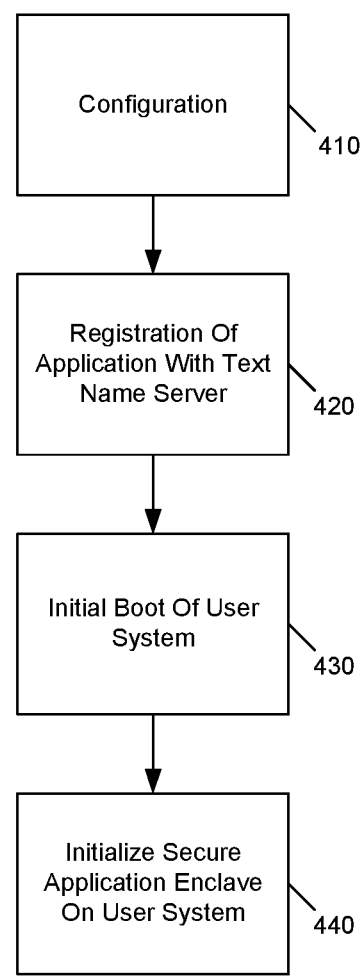
FIG. 4 is a flowchart of a process for establishing a secure application environment in accordance with one embodiment of the invention.

Referring to FIG. 4, a flowchart is provided of a process for establishing a secure application environment to protect the user's secrets. The process begins with "Configuration" step 410, in which the user's main computing device is configured to support a secure application enclave. Configuration of the user's main computing device begins with the manufacturer of the CPU of the user's main computing device, when the manufacturer generates a Unique Device Number (UDN) for the computing device. The UDN is a number that is unique for that computing device and may be displayed on the external surface of the computing device or otherwise communicated in documentation for the computing device. The UDN is created by the CPU manufacturer, shared with the Original Equipment Manufacturer (OEM), and ultimately communicated to the end user of the computing device.

To further support establishment of a secure application enclave, the manufacturer may also configure the computing device to include a secure enclave called a registration enclave. A registration enclave, such as registration enclave 328 of FIG. 3, runs locally on each computing device that has been enabled for secure application enclave support. The manufacturer obtains a signed certificate for the registration enclave from a Certificate Authority, where the certificate includes a public key for the registration enclave. The registration enclave has access to the private key and the certificate itself, which certifies the authenticity of the registration enclave. In one embodiment, certificates with the same fields as X.509 certificates are used, but with a simpler encoding scheme, e.g., type length value encoding. The subject field of the certificate contains the Unique Device Number (UDN) for the device hosting the registration enclave. Although the UDN can take various forms, in one embodiment, the UDN is a hash of the public key of the registration enclave for the computing device.

In an environment where secure enclave-enabled devices are personal computers and smart phones, a Rivest-Shamir-Adleman (RSA) public-key encryption algorithm may be used for device signatures and an Elliptic Curve Digital Signature Algorithm (ECDSA) may be used for back end server signatures. Registration enclaves, such as registration enclave 328 for main computing device 302 of FIG. 3, have access to their own respective RSA signing certificate and the corresponding private key. Furthermore, registration enclave 328 also has access to a public verification key for servers such as enrollment server 360 of FIG. 3. Servers such as enrollment server 360 may have a public (root) key for the Certificate Authority.

Also in "Configuration" step 410, the manufacturer may configure the computing device to include a secure application enclave, such as secure application enclave 318 of FIG. 3. The secure application enclave will be enrolled with an enrollment server, such as enrollment server 360 of FIG. 3, to provide a protected environment for a particular secure application, such as secure application 350 of FIG. 3. Note that the term "secure application" is used herein to refer to an application configured to execute within a secure application enclave environment as shown in FIG. 3, application 350 may include both trusted and untrusted portions and is not inherently trusted without executing inside a secure application enclave. To facilitate the initialization of the secure application enclave, the secure application enclave is configured with identification information for the local registration enclave; e.g., secure application enclave 318 is configured with identification information for the local registration enclave 328. This identification information may include the name of a local registration service that includes registration enclave 328, as well as a port number for the registration service. Secure application enclave 318 will establish a secure communication channel with registration enclave 328 and requires an identifier for registration enclave 328 to initiate the secure communication channel.

As an alternative to the embodiment where the manufacturer configures the computing device to include a secure application enclave, the computing device may be configured to support a secure application enclave at a later time when the user installs the secure application for use on the computing device. When the secure application is installed on the computing device, the secure application will include trusted application code to run within a secure application enclave.

Control proceeds from "Configuration" step 410 to "Registration of Application with Text Name Server" step 420. In step 420, the developer of an application registers his or her secure application enclave-enabled application (referred to hereafter as an SAE-enabled application) with a text name server, such as text name server 320 of FIG. 3. This task is carried out by the developer of the application prior to deployment of the application as a SAE-enabled application. The text name is a user-friendly identifier for the application. In addition to the text name, an identifier for the application is assigned by the developer. For example, the identifier may include values for a signer of the certificate (MRSIGNER) for the registration enclave, a product identifier (ISVPRODID), and a security version number (ISVSVN) associated with the product. The application identifier may be represented as a tuple (MRSIGNER, ISVPRODID, ISVSVN). A text name may be considered to be valid if registered with the text name server. The registration step ensures there are no text name collisions between distinct applications. The text name server keeps a list of registered text names along with the corresponding application identifier tuples (MRSIGNER, ISVPRODID, ISVSVN) for each application. A more detailed explanation of "Registration of Application with Text Name Server" step 420 is provided below with reference to FIG. 5.

Figure 5:
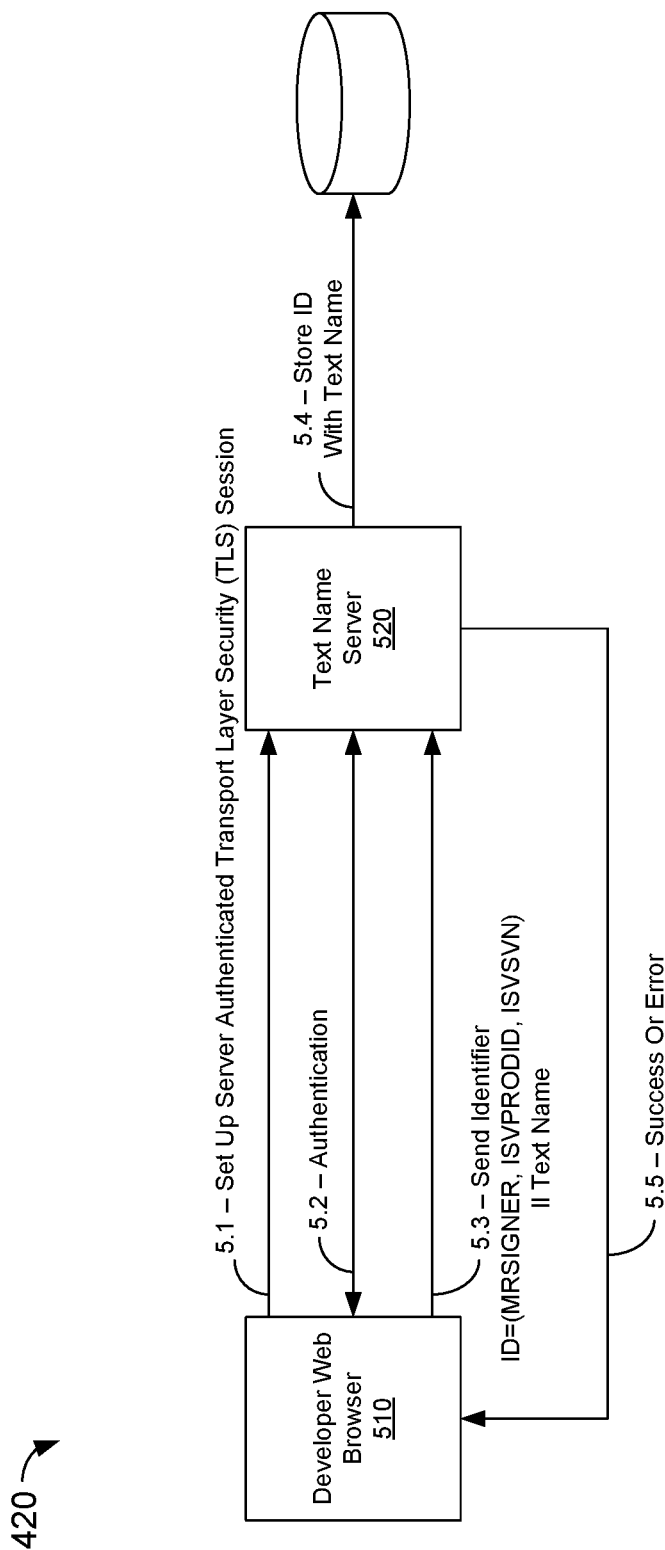
FIG. 5 is a diagram showing information flows between a developer web browser used by a developer of a secure application and a text name server, such as the text name server of FIG. 3.

Referring to FIG. 5, in action 5.1, a developer uses a developer web browser 510 to establish a server-authenticated Transport Layer Security (TLS) session with text name server 520. To accomplish action 5.1, the developer uses the Uniform Resource Locator (URL) of the text name server 520. In action 5.2, authentication of the developer's access to the text name server 520 is performed. For example, the developer may first register as a user of text name server 520 and receive a username and establish a password. The developer may then login to the text name server 520 by providing the username and password. In action 5.3, the developer uses developer web browser 510 to send a requested text name along with the application identifier tuple (MRSIGNER, ISVPRODID, ISVSVN) to the text name server 520, over the mutually authenticated TLS session. If the application identifier tuple from the request is not associated with any other text name, and the requested text name is not associated with another application identifier tuple, then the registration succeeds. In action 5.4, upon successful registration, text name server 520 stores the application identifier tuple (MRSIGNER, ISVPRODID, ISVSVN) with the requested text name. In action 5.5, text name server 520 notifies the developer web browser 510 of the status of the registration of the application as either "Success" or "Error."

Returning to FIG. 4, after "Registration of Application with Text Name Server" step 420, control proceeds to "Initial Boot of User System" step 430. On initial boot of the user's system, a trusted computing base (TCB) for secure enclaves support is loaded into memory and executed. The secure enclaves TCB creates an MRSIGNER sealing key for the registration enclave. In addition, the TCB for secure enclaves support encrypts the second device enrollment private key and corresponding certificate under the sealing key using Advanced Encryption Standard—Galois/Counter Mode (AES-GCM). The private key and certificate may be deleted from the secure enclaves TCB memory.

Still referring to FIG. 4, from "Initial Boot of User System" step 430, control proceeds to "Initialize Secure Application Enclave on User System" step 440. Initialization of the secure application enclave occurs upon the user's initial invocation of the SAE-enabled application. A more detailed explanation of "Initialize Secure Application Enclave on User System" step 440 is provided with reference to FIGS. 6A, 6B and 6C.

Figure 6A:
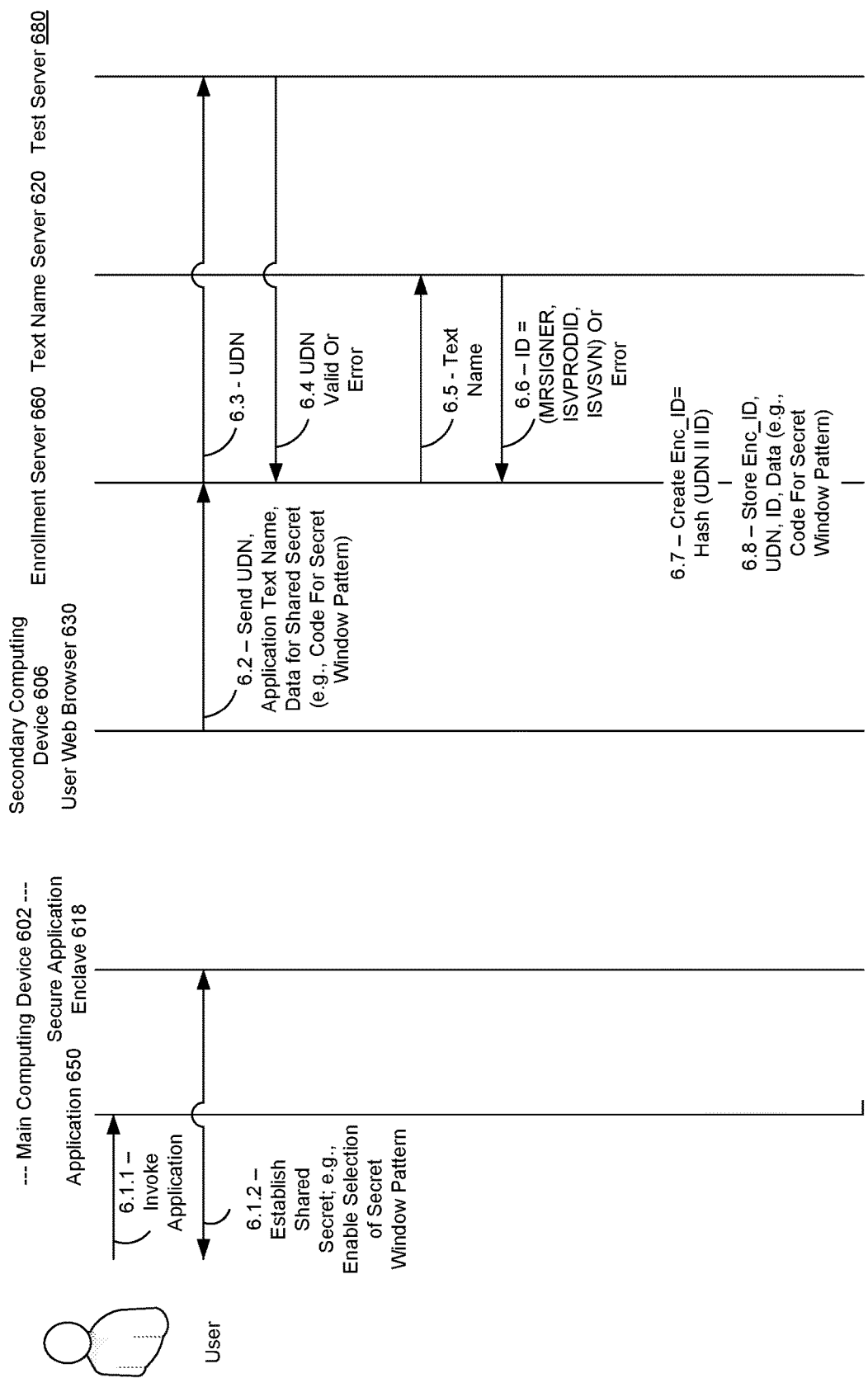
FIGS. 6A, 6B, and 6C show information flows between components of the environment of FIG. 3.

Referring to FIG. 6A, in action 6.1.1, the user invokes the application 650 (that is to be enabled for secure application enclave support) initially on the main computing device 602, e.g., by clicking the application icon in a user interface of the main computing device 602. Invoking secure application 650 will cause secure application enclave 618 to be established and trusted application code (such as trusted application 354 of secure application 350 of FIG. 3) to be loaded into memory of secure application enclave 618. In one embodiment, upon invoking secure application 650, the user is provided with instructions to initialize the secure application enclave 618. In one embodiment, the instructions for initializing secure application enclave 618 enable a shared secret to be established between the user and the secure application enclave 618, as shown in action 6.1.2. The shared secret can be used later at runtime to confirm that the user is interacting with the legitimate secure application enclave 618 and not malware. In one embodiment, the shared secret is established by secure application enclave 618 causing a window pattern to be displayed via a secure output mechanism, such as a Protected Audio/Video Path (PAVP) or sprite window, of main computing device 602. The display of the window pattern is associated with a random code, which may be displayed within or alongside the window pattern. The user selects the window pattern by entering the associated random code into web browser 630 of the secondary computing device 606 as part of action 6.2. Therefore, the information entered in action 6.2 via secondary computing device 606 includes the random code displayed on main computing device 602 identifying the shared secret window pattern selected by the user.

Figure 6B:
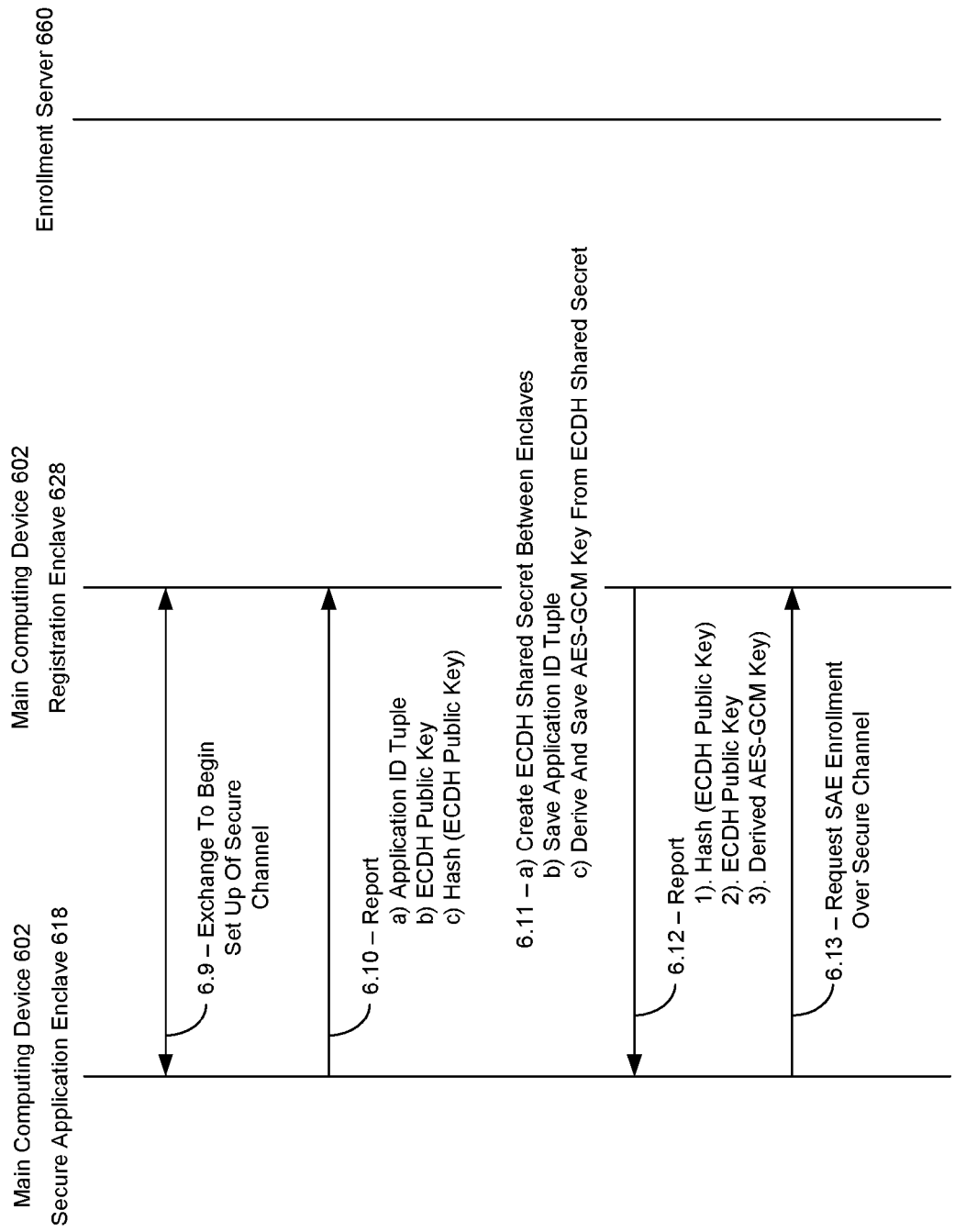
Figure 6C:
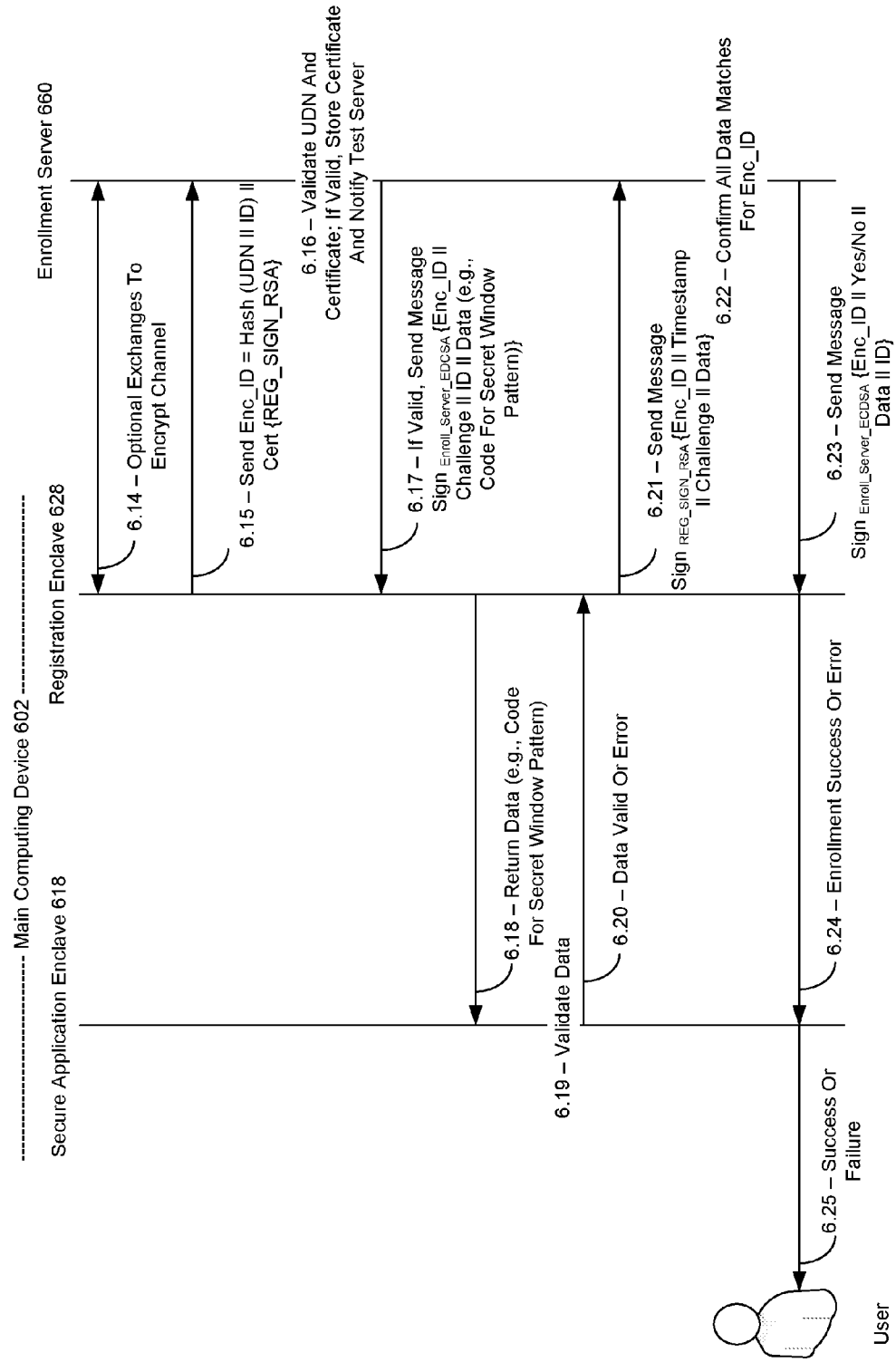

Actions 6.1.1 of FIG. 6A through action 6.25 of FIG. 6C are performed to initialize secure application enclave 618 on main computing device 602 and enroll main computing device 602 with enrollment server 660 as a provider of a secure application enclave 618 for secure application 650. At action 6.24 of FIG. 6C, secure application enclave 618 is informed by registration enclave 628 whether enrollment was successful. If enrollment was successful, subsequent communications from secure application enclave 618 of main computing device 602 will include verification that secure application enclave 618 is in possession of the shared secret established with the user in action 6.1.2. For example, in the embodiment described above with reference to a shared secret window pattern, the secure application enclave 618 will display the shared secret window pattern whenever secure application 650 is executing within secure application enclave 618.

In action 6.24, if secure application enclave 618 is informed by registration enclave 628 that enrollment of main computing device 602 with enrollment server 660 was unsuccessful, secure application enclave 618 may provide an error message to the user in action 6.25. Secure application enclave 618 may also terminate execution of secure application 650 or take other action to indicate to the user that secure application 650 is unsecure.

Referring back to FIG. 6A, in action 6.2, the user enters information into a web browser 630 of secondary computing device 606 to begin initialization of secure application enclave 618 and enrollment of main computing device 602 with enrollment server 660. Subsequently, the user returns to the main computing device 602 and completes the initialization of the secure application enclave 618. To confirm that the user is not interacting with malware but instead with the legitimate secure application enclave 618, the user is presented with information verifying that secure application enclave 618 possesses the shared secret established with the user in action 6.1.2. For example, secure application enclave 618 may display a new window with the shared secret window pattern described above, on the main computing device 602. Presentation of the shared secret window pattern confirms to the user that enrollment of main computing device 602 with enrollment server 660 was successful. The user is to remember this window pattern, which will be presented as part of all windows subsequently displayed by secure application enclave 618. The random code will not be displayed as a part of the user window pattern on windows shown after enrollment of secure application enclave 618 is complete. Other secrets and policy parameters for secure application enclave 618 may be configured once the user has confirmed that the secure application enclave 618 is in possession of the shared secret established with the user.

Since it is possible that the user may interact with malware on either secondary computing device 606 or main computing device 602 during initialization of the secure application enclave 618, the instructions to the user for performing action 6.2 may be provided by both computing devices 602 and 606. The instructions may emphasize, in a redundant manner, that the main computing device 602 is to verify possession of the shared secret by the secure application enclave 618. In one embodiment, both computing devices 602 and 606 will indicate that enrollment of the main computing device 602 as a provider of secure application enclave 618 is successful; otherwise, if either computing device 602 or 606 does not indicate that enrollment was successful, enrollment of the main computing device 602 as a provider of the secure application enclave 618 has failed.

The following section provide additional information about the initialization of secure application enclave 618 and enrollment of main computing device 602 as a provider of a secure application enclave 618 for secure application 650.

Returning to FIG. 6A, in action 6.2, initialization of the secure application enclave 618 on main computing device 602 begins. To initialize the secure application enclave 618, the user needs the following information: (1) The UDN for the main computing device 602; this information may be provided, e.g., on a sticker on the external surface of the main computing device 602 and/or in documentation provided with the main computing device 602; (2) the enrollment server 660 Uniform Resource Locator (URL), which may also be provided on the sticker/documentation for the main computing device 602; and (3) application information such as the application text name registered by the developer for the application. The application text name may be obtained by the user when the user downloads or purchases the secure application. The user is instructed to contact the enrollment server 660 using a web browser 630 of another computing device, referred to herein as secondary computing device 606. The instructions may advise the user to contact the enrollment server 660 at the URL provided in the sticker/documentation for the main computing device 602 via a Transport Layer Security (TLS) session or other secure connection between the secondary computing device 606 and the enrollment server 660.

When the user establishes a secure session between secondary computing device 606 and enrollment server 660, in action 6.2, the user enters information for initializing the secure application enclave in a website provided by enrollment server 660. The information entered in action 6.2 includes the UDN for main computing device 602; entry of the UDN may be accomplished by photographing the sticker/documentation and uploading the photograph to the enrollment server 660 website. The information entered in action 6.2 also includes the application text name for which the secure application enclave was registered by the application developer, as described with reference to FIG. 5 above. The information entered in action 6.2 also includes data identifying a secret shared between the user and the secure application enclave; establishment of the shared secret is described in further detail below.

Still referring to FIG. 6A, in action 6.3, enrollment server 630 provides the UDN for main computing device 602 to test server 680, preferably via a mutually-authenticated TLS session. The purpose of the test server 680 is to detect when an adversary has replaced the UDN of a device with a new UDN. Test server 680 increments a counter for the UDN, indicating a number of secure application enclaves registered to main computing device 602. If the counter exceeds a threshold, test server 680 determines that another registration of a secure application enclave for main computing device 602 is not allowed, delays two seconds, and, if the counter still exceeds the threshold, returns an error in action 6.4. The two-second delay allows time for the counter to change due to a pending backlog of registrations or registration cancellations. If the counter does not exceed the threshold, test server 680 delays two seconds, and if the counter still does not exceed the threshold, returns an indicator in action 6.4 that the new registration of a secure application enclave for main computing device 602 is valid.

In action 6.5, if the test server 680 has indicated that another registration is valid for main computing device 602, enrollment server 660 sends the application text name provided by the user in action 6.2 to text name server 620, preferably over a mutually-authenticated TLS session connection. In action 6.6, text name server 620 returns the application identifier tuple (MRSIGNER, ISVPRODID, ISVSVN) associated with the text name (as described with reference to FIG. 5), or an error if the text name is not registered. In action 6.7, enrollment server 660 computes an enclave identifier as a hash function of the UDN concatenated with each of the components of the application identifier tuple; e.g., enc_id=SHA-256(UDN||MRSIGNER||ISVPRODID||ISVSVN). In action 6.8, enrollment server 660 stores enc_id, UDN, MRSIGNER, ISVPRODID, ISVSVN, and the data (code for the shared secret window pattern) together and deletes the record after a short period (e.g., 5 minutes).

FIG. 6B shows the interactions between components of main computing device 602, including secure application enclave 618 and registration enclave 628, in initializing secure application enclave 618. In action 6.9, secure application enclave 618 begins to establish a secure channel for communication with registration enclave 628. Even though enclaves 618 and 628 both execute on main computing device 602, as noted above, contents of each of enclaves 618 and 628 may be protected from access by software executing outside of the same secure enclave (even from other secure enclaves executing on the same main computing device 602). Thus, a secure channel is needed to communicate between secure application enclave 618 and registration enclave 628. To establish the secure channel, secure application enclave 618 was configured with identifying information for registration enclave 628 as part of local attestation between the two secure enclaves.

In action 6.10, secure application enclave 618 sends a report to registration enclave 628 to authenticate secure application enclave 618 to registration enclave 628. In one embodiment, the report uses the Elliptic curve Diffie-Hellman (ECDH) protocol, which is an anonymous key agreement protocol that allows two parties (here secure application enclave 618 and registration enclave 628), to establish a shared secret over an insecure channel. In one embodiment, the report sent in action 6.10 from secure application enclave 618 to registration enclave 628 contains user data that includes the following information for secure application enclave 618: (1) application identifier tuple (MRSIGNER, ISVPRODID, ISVSVN), (2) the ECDH public key, and (3) a SHA-256 hash of the ECDH public key.

In action 6.11, in response to receiving the report from secure application enclave 618, registration enclave 628 creates an ECDH shared secret. In addition, registration enclave 628 saves the application identifier tuple provided in the report from secure application enclave 618. Registration enclave 628 also saves an Advanced Encryption Standard—Galois/Counter Mode (AES-GCM) key derived using a Hash-based Message Authentication Code (HMAC) Key Derivation Function (HKDF) from the ECDH shared secret.

In action 6.12, registration enclave 628 sends a report to secure application enclave 618. In one embodiment, the report includes user data containing an SHA-256 hash of an ephemeral ECDH public key for registration enclave 628, as well as the ECDH public key and the AES-GCM key derived from the ECDH shared secret.

Once the secure channel has been established between secure application enclave 618 and registration enclave 628, in action 6.13, secure application enclave 618 requests registration enclave 628 to be enrolled as a registered secure application enclave with enrollment server 660.

FIG. 6C shows the interactions between secure application enclave 618 and registration enclave 628 of main computing device 602 with enrollment server 660 in completing initialization of secure application enclave 618. In action 6.14, an authenticated exchange can be performed between registration enclave 628 and enrollment server 660 to set up an authenticated encrypted channel (indexed by an enclave identifier enc_id) to provide confidentiality. In action 6.15, registration enclave 628 calculates its own secure application enclave identifier by hashing UDN with the application identifier tuple. Registration enclave 628 then provides the resulting hash value along with the certificate for registration enclave 628; in one embodiment, registration enclave 628 provides enc_id=(SHA-256(UDN-||MRSIGNER||ISVPRODID||ISVSVN))||cert{REG_SIGN_RSA}.

In action 6.16, enrollment server 660 validates the information provided by registration enclave 628 in action 6.15. Enrollment server 660 validates the UDN by hashing the public verification key from the certificate received from registration enclave 628. If the hash result is not identical to the UDN, an error is returned to registration enclave 628. If the certificate is not valid, then an error is also returned to registration enclave 628. If the certificate is valid, then enrollment server 660 stores the certificate with the application identifier tuple (indexed by enc_id) for the main computing device 602. If the certificate is valid, the enrollment server 660 also sends a message to the test server 680 with the UDN to indicate that the test server 680 can permanently store the UDN record with the counter reflecting the number of registrations for this UDN. If test server 680 has previously received any such messages from the enrollment server 660, test server 680 may keep the record for the UDN. Otherwise, test server 680 deletes the record for the UDN after a short period of time.

Upon validation of the UDN and certificate in action 6.16, enrollment server 660 forwards a message to registration enclave 628 in action 6.17. In one embodiment, the message includes a elliptic-curve digital signature algorithm (ECDSA) signature by enrollment server 660 in the form Sign Enroll_Server_ECDSA{enc_id||challenge||ID||data}, where challenge is a one-time random value of at least 128 bits in length. Enrollment server 660 logs the message and associated data for future reference.

Upon receipt of the signed message from enrollment server 660, registration enclave 628 validates the signature using the public key. Registration enclave 628 then compares the identifier ID from the signed message with the application identifier tuple saved earlier when the secure channel was established between registration enclave 628 and secure application enclave 618 in actions 6.9 through 6.12. If the application identifier tuple values are equal, registration enclave 628 returns the data (i.e., the shared secret window pattern's random code) to secure application enclave 618 in action 6.18 over the secure (AES-GCM protected) channel. Otherwise, registration enclave 628 returns an error to secure application enclave 618.

Upon receiving the data from registration enclave 628, in action 6.19, secure application enclave 618 confirms whether the data (random code for the shared secret window pattern) returned by the registration enclave 628 is identical to the code stored (and provided by secure application enclave 618 in action 6.10 as part of the report). If so, secure application enclave 618 returns success to the registration enclave 628; otherwise, secure application enclave 618 returns an error and terminates the enrollment procedure.

Upon receiving a notification that the data (random code for the shared secret window pattern) is valid from secure application enclave 618, registration enclave 628 sends a message to enrollment server 660 in action 6.21. In one embodiment, the message includes the signature Sign$_{REG\_SIGN\_RSA}$ (enc_id||timestamp||challenge||data). The challenge is a copy of the challenge value sent by the enrollment server 660 to the registration enclave 628 in action 6.17, and the data value is the same data value that was provided by enrollment server 660 in action 6.17.

Upon receiving the signed message from registration enclave 628, in action 6.22, enrollment server 660 uses enc_id as an index to check that the challenge matches the challenge originally sent in action 6.17 and that all corresponding data values match the data stored by enrollment server 660 for that enc_id. All of the values including the timestamp may be logged by enrollment server 660. If all checks are affirmative, in action 6.23, the enrollment server 660 sends a signed message indicating a success status to the registration enclave 628; otherwise, enrollment server 660 sends a signed message indicating an error status. The data and ID values provided in the signed message are the values that are associated with enc_id. In one embodiment, the signed message takes the form Sign Enroll_Server_ECDSA{enc_id||yes/no||data||ID}.

In action 6.24, registration enclave 628 sends a message to application enclave 618 indicating whether enrollment was successful. A similar message (not shown) indicating whether enrollment of the secure application enclave 618 was successful is also sent to web browser 630 of secondary computing device 606.

FIGS. 6A, 6B, and 6C provide an example of initializing a secure application enclave on a device such as a personal computer or smartphone. A similar technique applies to server hosts; the main difference is that instead of a user window pattern, a cryptographic key will be established on the server.

In one embodiment, if at least one of the two devices is not compromised, then the user may install a secure application enclave and establish a shared secret that is known only to the secure application enclave (SAE) and the user. If the protocol fails, an error message will be returned to the user that will enable the user to recognize that the computing device has been compromised. The protocol relies upon the assumption that the following back end servers are not compromised and follow the protocol: the test server, the certificate authority, the text name server, and the enrollment server. In one embodiment, a security goal is to detect a non-protocol conformant enrollment server via the audit log.

The techniques described herein make it much more difficult for an attacker to take control of a computing device that is enabled to provide secure application enclave support.

The following examples pertain to further embodiments.

Example 1 includes an apparatus to enroll a computing device as a provider of a secure application enclave, where the apparatus comprises: a processor; and a memory, where the memory comprises instructions that, when executed by the processor, enable a computer to: obtain a device identifier for a first computing device, application information, and data for a shared secret from a second computing device, where the first computing device is configured to provide a secure application enclave to support execution of a secure application associated with the application information, and the shared secret is shared between the secure application enclave and a user of the first computing device; and determine whether to enroll the first computing device as a provider of the secure application enclave for the secure application using the device identifier, the application information, and the data for the shared secret.

In Example 2, the instructions further enable the computer to cause the secure application enclave to be notified whether enrollment of the first computing device is successful.

In Example 3, the secure application enclave causes a display by the first computing device verifying possession of the shared secret by the secure application enclave when the secure application is executing within the secure application enclave.

In Example 4, the shared secret is a window pattern; and the display by the first computing device verifying possession of the shared secret comprises display of the window pattern.

In Example 5, the instructions of Example 4 further enable the computer to receive a request to enroll the first computing device as the provider of the secure application enclave for the secure application, where the request comprises a certificate signed by a registration enclave of the first computing device; calculate a hash result by hashing a public key of the registration enclave from the certificate; and determine whether the hash result equals the device identifier.

In Example 6, the instructions of Example 4 further enable the computer to use the application information to obtain an application identifier for the secure application; create an enclave identifier using the device identifier and the application identifier; store the enclave identifier, the device identifier, the application identifier, and the data for the shared secret; request the registration enclave to respond to a challenge; request the registration enclave to validate the stored data for the shared secret; and enroll the first computing device if the hash result equals the device identifier, the registration enclave passes the challenge, and the registration enclave validates the stored data for the shared secret.

In Example 7, a method to enroll a computing device as a provider of a secure application enclave includes obtaining a device identifier for a first computing device, application information, and data for a shared secret from a second computing device, where the first computing device is configured to provide a secure application enclave to support execution of a secure application associated with the application information, and the shared secret is shared between the secure application enclave and a user of the first computing device; determining whether to enroll the first computing device as a provider of the secure application enclave for the secure application using the device identifier, the application information, and the data for the shared secret; and causing the secure application enclave to be notified whether enrollment of the first computing device is successful.

In Example 8, the secure application enclave verifies enrollment of the first computing device before executing the secure application within the secure application enclave.

In Example 9, the secure application enclave causes a display by the first computing device verifying possession of the shared secret by the secure application enclave when the secure application is executing within the secure application enclave.

In Example 10, the shared secret is a window pattern; and the display by the first computing device verifying possession of the shared secret comprises display of the window pattern.

In Example 11, the method of Example 7 further comprises receiving a request to enroll the first computing device as the provider of the secure application enclave for the secure application, where the request comprises a certificate signed by a registration enclave of the first computing device; calculating a hash result by hashing a public key of the registration enclave from the certificate; and determining whether the hash result equals the device identifier.

In Example 12, the method of Example 11 further comprises using the application information to obtain an application identifier for the secure application; creating an enclave identifier using the device identifier and the application identifier; storing the enclave identifier, the device identifier, the application identifier, and the data for the shared secret; requesting the registration enclave to respond to a challenge; requesting the registration enclave to validate the stored data for the shared secret; enrolling the first computing device if the hash equals the device identifier, the registration enclave passes the challenge, and the registration enclave validates the stored data for the shared secret.

In Example 13, an apparatus to enroll a computing device as a provider of a secure application enclave comprises means for performing the method of any one of Examples 7-12.

In Example 14, a computer-readable medium to enroll a computing device as a provider of a secure application enclave comprises instructions to perform the method of any one of claims 7-12.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor; and
a memory, wherein the memory comprises instructions that, when executed by the processor, enable a computer to:
obtain a device identifier for a first computing device, application information, and data for a shared secret from a second computing device, where the first computing device is configured to provide a secure application enclave to support execution of an application associated with the application information, and the shared secret is shared between the secure application enclave and a user of the first computing device;
determine whether to enroll the first computing device as a provider of the secure application enclave for the application using the device identifier, the application information, and the data for the shared secret, comprising to:
calculate a hash result by hashing a public key of a certificate for a registration enclave of the first computing device; and
determine whether the hash result equals the device identifier.

2. The apparatus of claim 1, wherein the instructions further enable the computer to:
cause the secure application enclave to be notified whether enrollment of the first computing device is successful.

3. The apparatus of claim 1, wherein
the secure application enclave causes a display by the first computing device verifying possession of the shared secret by the secure application enclave when the application is executing within the secure application enclave.

4. The apparatus of claim 3, wherein
the shared secret is a window pattern; and
the display by the first computing device verifying possession of the shared secret comprises display of the window pattern.

5. The apparatus of claim 1, wherein the instructions further enable the computer to:
receive a request to enroll the first computing device as the provider of the secure application enclave for the application, where the request comprises the certificate for the registration enclave of the first computing device.

6. The apparatus of claim 1, wherein the instructions further enable the computer to:
use the application information to obtain an application identifier for the application;
create an enclave identifier using the device identifier and the application identifier;
store the enclave identifier, the device identifier, the application identifier, and the data for the shared secret;
request the registration enclave to respond to a challenge;

request the registration enclave to validate the stored data for the shared secret; and enroll the first computing device if the hash result equals the device identifier, the registration enclave passes the challenge, and the registration enclave validates the stored data for the shared secret.

7. At least one non-transitory computer-readable medium comprising instructions, that when executed by a processor of a computing device, enable the computing device to:

obtain a device identifier for a first computing device, application information, and data for a shared secret from a second computing device, wherein the first computing device is configured to provide a secure application enclave to support execution of an application associated with the application information, and the shared secret is shared between the secure application enclave and a user of the first computing device;

determine whether to enroll the first computing device as a provider of the secure application enclave for the application using the device identifier, the application information, and the data for the shared secret, comprising to calculate a hash result by hashing a public key of a certificate for a registration enclave of the first computing device;

determine whether the hash result equals the device identifier; and cause the secure application enclave to be notified whether enrollment of the first computing device is successful.

8. The at least one non-transitory computer-readable medium of claim 7, wherein
the secure application enclave verifies enrollment of the first computing device before executing the application within the secure application enclave.

9. The at least one non-transitory computer-readable medium of claim 7, wherein
the secure application enclave causes a display by the first computing device verifying possession of the shared secret by the secure application enclave when the application is executing within the secure application enclave.

10. The at least one non-transitory computer-readable medium of claim 9, wherein
the shared secret is a window pattern; and
the display by the first computing device verifying possession of the shared secret comprises display of the window pattern.

11. The at least one non-transitory computer-readable medium of claim 7, wherein the instructions further cause the computing device to:
receive a request to enroll the first computing device as the provider of the secure application enclave for the application, wherein the request comprises the certificate for the registration enclave of the first computing device.

12. The at least one non-transitory computer-readable medium of claim 7, wherein the instructions further cause the computing device to:
use the application information to obtain an application identifier for the application;
create an enclave identifier using the device identifier and the application identifier;
store the enclave identifier, the device identifier, the application identifier, and the data for the shared secret;
request the registration enclave to respond to a challenge;
request the registration enclave to validate the stored data for the shared secret; and enroll the first computing device if the hash result equals the device identifier, the registration enclave passes the challenge, and the registration enclave validates the stored data for the shared secret.

13. A method comprising:
obtaining a device identifier for a first computing device, application information, and data for a shared secret from a second computing device, wherein the first computing device is configured to provide a secure application enclave to support execution of an application associated with the application information, and the shared secret is shared between the secure application enclave and a user of the first computing device;

determining whether to enroll the first computing device as a provider of the secure application enclave for the application using the device identifier, the application information, and the data for the shared secret, comprising calculating a hash result by hashing a public key of a certificate for a registration enclave of the first computing device and determining whether the hash result equals the device identifier; and notifying the secure application enclave whether the first computing device was enrolled.

14. The method of claim 13, further comprising:
receiving a request to enroll the first computing device as the provider of the secure application enclave for the application, where the request comprises the certificate for the registration enclave of the first computing device.

15. The method of claim 13, further comprising:
using the application information to obtain an application identifier for the application;
creating an enclave identifier using the device identifier and the application identifier;
storing the enclave identifier, the device identifier, the application identifier, and the data for the shared secret;
requesting the registration enclave to respond to a challenge;
requesting the registration enclave to validate the stored data for the shared secret; and
enrolling the first computing device if the hash result equals the device identifier, the registration enclave passes the challenge, and the registration enclave validates the stored data for the shared secret.

16. An apparatus comprising:
means for obtaining a device identifier for a first computing device, application information, and data for a shared secret from a second computing device, where the first computing device is configured to provide a secure application enclave to support execution of an application associated with the application information, and the shared secret is shared between the secure application enclave and a user of the first computing device; and means for determining whether to enroll the first computing device as a provider of the secure application enclave for the application using the device identifier, the application information, and the data for the shared secret, comprising:
means for calculating a hash result by hashing a public key of a certificate for a registration enclave of the first computing device; and
means for determining whether the hash result equals the device identifier.

17. The apparatus of claim 16, further comprising:
means for notifying the secure application enclave whether enrollment of the first computing device was successful.

18. The apparatus of claim 16, further comprising:
means for receiving a request to enroll the first computing device as the provider of the secure application enclave for the application, wherein the request comprises the certificate for the registration enclave of the first computing device.

19. The apparatus of claim 16, further comprising:
means for enrolling the first computing device if the hash result equals the device identifier.

20. The apparatus of claim 16, further comprising:
means for using the application information to obtain an application identifier for the application;
means for creating an enclave identifier using the device identifier and the application identifier;
means for storing the enclave identifier, the device identifier, the application identifier, and the data for the shared secret;
means for requesting the registration enclave to respond to a challenge;
means for requesting the registration enclave to validate the stored data for the shared secret; and
means for enrolling the first computing device if the hash result equals the device identifier, the registration enclave passes the challenge, and the registration enclave validates the stored data for the shared secret.

* * * * *